United States Patent Office 3,300,373
Patented Jan. 24, 1967

3,300,373
METHOD OF CONTROLLING GROWTH OF MICROORGANISMS IN INDUSTRIAL WATER SYSTEMS
Leonard L. Wolfson, Park Forest, Ill., assignor to Nalco Chemical Company, Chicago, Ill., a corporation of Delaware
No Drawing. Filed May 10, 1965, Ser. No. 454,697
7 Claims. (Cl. 162—190)

This invention relates to the control of microorganisms in aqueous fluid media through the use of novel microbiocides. More particularly, the present invention is concerned with a method of inhibition and control of microorganisms in industrial process water systems through the use of certain substituted benzene compounds.

The inhibition and control of the growth and reproduction of microorganisms in aqueous waters in industrial processes has long been recognized as a particularly burdensome problem. The environment of the aqueous medium itself is often extremely conducive to rapid multiplication and growth of these undesirable microorganisms. Only through the use of carefully tailored microbiocidal compositions can the growth and reproduction of these undesirable organisms be reliably controlled without detriment to the process in which the water is used. Without effective control, loss of product, inferior product, production-time loss, and other types of expensive problems may occur in the system.

The particular problems inherent in the microbiological control of an aqueous fluid medium are vastly different than those involving control of other harmful organisms in environmental conditions other than that of water. For example, many times a chemical is rendered completely inactive by the particular surrounding media containing the undesirable microorganisms. Compounds such as ethylene oxide and betapropiolactone which are well known fungicides, are completely or nearly completely inactive in aqueous media with regard to inhibition of growth and reproduction of the microorganisms contained therein.

General considerations of antimicrobic agents and processes reveal that efficient control of each specific type of microorganism growth, requires a specific chemicalphysical type of treatment. The choice of the active chemical and/or the method of application depends upon the system to be controlled. Different biocidal processes and antibiotic chemicals cannot legitimately be equated in a general manner.

Many broad classes of biocidal agents are known to the art. It is also known that antiseptics, disinfectants, fumigants, fungistats, fungicides, preservatives, chemical and physical sterilants, and pasteurization agents must all be particularly designed to obviate the specific problem at hand. The inherent chemical make-up of each class of composition intrinsically depends upon the organisms to be controlled and medium in which they are contained. Physical form, in addition to chemical configuration, may also be important. For example, in the control of insects the particular chemical normally must be low boiling and capable of volatilization in order to contact the undesirable pest. In like manner, a fumigant must have a high degree of toxicity to insects in all stages of life cycle.

One problem in the broad spectrum of microbiological control is that of industrial process water systems. This is the problem solved by the invention here. A particular area involved is treatment of recirculating waters. Specifically, in order to economically utilize the aqueous industrial process media it is often necessary to recirculate it many times. This recirculation causes many difficult problems, among which is the gradual build-up and accumulation of undesirable miroorganisms in the aqueous fluid. Various species of bacteria and fungi are favorably produced in such an environment of recirculating use.

One of the most acute industrial biological control problems is that in papermill water systems which contain aqueous dispersions of paper-making fibers. The uncontrolled build-up of microbiological slime due to the accumulation of microorganisms, causes off-grade production, increased maintenance costs, decreased production because of breaks and the requirement of more frequent wash-ups and excessive raw material usage. For example, slime deposits result in contamination of the stock by deposition thereon with consequent breaks in the subsequent formed sheets. It has been discovered that chemical control of these microorganisms will obviate the problems recited above. Application of selected slimicides to strategic locations throughout the paper-making process achieves good control and does away with potentially troublesome conditions.

In the papermill industry itself the widespread adoption of closed white water systems creates especially severe operating conditions since this system lends itself even more to accumulation of slime deposits by virtue of the continuous recycling of the white water. In order to overcome the problems created by the presence of slime in these closed white paper systems, paper manufacturers have for a long time been seeking slime control agents which not only keep the slime in abeyance by inhibiting the growth of slime but also effect a kill and inhibit initial slime formation by impairment of a vital function of slime-forming organisms, namely, reproduction.

The extreme complexity of a paper-making system coupled with the favorable growth conditions for microorganisms through the use of recirculating water causes slime masses to thrive and form throughout the various individual parts of the system. Particularly troublesome areas are corners of equipment, areas of poor stock flow, and high density storage sites. These slime masses prevent normal flow of stock suspension, make the stock lumpy, and prevent normal sheet formation.

Generally, papermill systems contain from 0.1% to 15% by weight of cellulosic fiber material in the form of an aqueous pulp. Such an aqueous pulp medium is potentially conducive to the growth of such bacteria as *Pseudomonas aeruginosa, Aerobacter cloacae, Streptococcus faecalis, Bacillus pumilus, Micrococcus pyogenes, Bacillus subtilis, Aerobacter aerogenes, Bacillus mycoides, Desulfovibrio desulfuricans,* and fungi such as *Penicillium glaucum, Cephalosporium, Aspergillus terreus,* Trichoderma and *Aspergillus niger.*

Another use of water in industry is that of an efficient cooling medium for industrial cooling towers, air conditioning equipment, internal combustion engines, and the like.

Since heat may be easily and economically removed by water in such systems as evaporative cooling towers, these systems have been widely adopted in many industries. Again the water used in such systems is generally recirculated, thus complicating the problem of microbiological control. The microorganisms that accumulate in the towers impair their efficiency with respect to heat exchange. Slime build-ups result in large adherent masses which plug equipment and restrict flow. These same microorganisms cause deterioration of cooling tower lumber by selective removal of cellulose from the surface. It has been found that even small amounts of nutrients found in cooling tower systems support these microorganisms in their reproduction and defeat control efforts. Solution of this specialized and difficult industrial problem not only requires use of chemicals effective to control of microorganisms, but in addition these same chemicals must possess a sufficiently high vapor pressure so as not to be carried off and create a potential hazard to those working in the area.

One approach to the problem of control of microorganisms in industrial process waters has been effected through the use of a combination of chemical treating agents. It would be an advantage to the industry to discover a class of chemicals useful as a single reagent for inhibiting and control of undesirable microorganisms in aqueous media, without subsequent addition of other treating agents. Another advantage to the industry would be the creation of chemicals which, while effective as biocides and biostats in aqueous media, nevertheless are relatively non-volatile, non-toxic to humans, easily handled, and may be injected into the system to be treated with a minimum of effort and special equipment.

It would also be desirable if a microbiocidal agent could be found to adequately control microorganisms of the type occurring not only in the aqueous systems described above, but also in other aqueous media such as oil-field water-flood treatments and the like.

Not only is it extremely desirable that chemicals be found which are able to control a number of harmful species of microorganisms in the particular aqueous industrial system, but it is also desired that these same treating agents have activity over a wide pH range. It is further desired that these same chemicals not be readily affected by the particular medium in which the microorganisms are contained, but rather possess the ability to kill, inhibit, and control microorganisms before being chemically or physically modified. It would be a valuable contribution if a class of microbiocides could be synthesized for effective efficient biocidal use in aqueous environment.

It, therefore becomes an object of the invention to provide an effective method of inhibition and control of growth and reproduction of undesirable microorganisms contained in aqueous fluid media via a specific class of chemicals.

A specific object is the control of papermill slime deposits through the use of certain microbiocidal chemicals, and particularly to provide chemicals useful in such specific papermill systems as a closed white water system.

Other objects will appear hereinafter.

In accordance with the invention it has been discovered that the control and inhibition of the growth and reproduction of microorganisms in industrial process waters may be effected by the incorporation therein of 2,4-dinitrohalobenzene.

The halo radical in the above class of compounds may be chloro, bromo or fluoro. Greatly preferred due to low cost, excellent activity and availability is 2,4-dinitrochlorobenzene.

By treating industrial process waters with the above substituted benzene compounds, the invention is directed to providing a microbiologically controlled industrial process water which comprises a major portion of an aqueous liquid and a minor portion of at least a microbiocidally active amount of one or more microbiocides falling within the above defined class.

The method of inhibition of growth and reproduction of microbiological organisms in industrial process water systems broadly comprises the steps of treating such systems by adding to them at least a microbicidal amount of a composition of the invention. The amount of 2,4-dinitrohalobenzene compound necessary to achieve control of the microorganisms will, of course, vary depending upon the particular system treated, as well as the types of species found present. In most cases, however, as little as 0.1 p.p.m. to 25 p.p.m. will give adequate control, although quantities ranging as high as 500 pp.m may be necessary in some cases. Small quantities of the chemical are extremely effective in industrial process waters where the water is recirculated and re-used, which means that the quantity of the chemical will gradually build up to a maximum usable and effective treating dosage, which may be calculated knowing the specific factors in each particular system.

The invention is particularly useful when the described chemical treating agents are added to papermaking systems and industrial cooling water systems. The latter system may be either a once-through or recirculating system, though the compositions of the invention find greater use in a recirculating cooling tower due to the magnitude of the microorganism control problem in this area. A paper system which can be treated with particular success by the above process is a closed white water system. However, slime-producing organisms in any paper-making process water system may be generally inhibited by the use of the compositions of the invention.

It has been determined that when the chemicals of the invention are used in papermill systems and particularly in closed white water papermill systems the amount of chemical used in effectively controlling the microorganisms contained therein, may vary from .01 to 10 pounds per ton of paper pulp. More preferably the chemical is added in amounts from 0.1 to 5 pounds per ton of pulp.

Prior to use the active microbiocide may be dispersed or solubilized in various solvents. In addition, these same formulations may contain other components such as emulsifiers. Useful emulsifiers include sulfonated non-ionics, polyoxyalkylene ethers and their derivatives, and sulfonated oils. Blends of the above in any proportion may also be employed. $C_6$-$C_{22}$ alkenyl succinic anhydrides or their alkali metal salts or such materials as ethoxylated and/or propoxylated fatty-substituted amines which contain from 3 to 15 mols of ethylene oxide are also useful emulsifiers.

A wide variety or organic solvents may be employed. Selection may be made from among alcohols such as ethanol, aliphated hydrocarbons, aroxyl compounds, alkoxy compounds, and alkaryl solvents. Desirable solvents are those containing aromatic groups such as petroleum aromatic solvents, xylene, toluene, or benzene.

The materials of the invention are quite frequently soluble at use concentrations in industrial process water systems so that chemical briquette absorbents such as soda ash, dextrine and the like may be used to prepare solids materials for feeding with conventional briquette feeding equipment.

EVALUATION OF THE INVENTION

In order to determine the efficacy of the invention for treating various types of industrial process waters under a wide variety of conditions, two test methods were used. These test methods correlate with the conditions existing in many industrial process systems where microbiological problems occur. These test methods are set forth in detail below:

*Test method.—Gas tube and growth inhibition*

In this test the culture medium used consisted of 24 grams of dextrose, and 1 gram of "Basaminbact" added to one liter of Chicago tap water and sterilized by autoclaving under 15 pounds of pressure for 15 minutes. The final pH of the autoclaved medium was 6.8±0.1. An appropriate amount of 18 to 24 hour nutrient broth culture of *A. aerogenes* or spore suspension of *A. niger* was mixed with 200 ml. of the culture medium immediately before starting tests, to give an inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introduced into the culture medium. The chemical and the inoculated medium were mixed gently. Two control tests were also run, one in which the chemical was omitted, and the second in the absence of inoculum. In mixing, tubes were inverted in the *A. aerogenes* gas inhibition study so as to fill the gas detection vials. The *A. niger* fungal growth inhibition study tubes were shaken. Inhibition ranges for *A. aerogenes* were determined by noting the presence of absence of gas production in the gas vials after 48 hours incubation of tubes at 90° F. The *A. niger* test tubes were incubated for 5 days at 30° C. and inhibition levels were determined by noting presence or absence of growth in the tubes at the end of this period of time.

Using the above described chemical synthesis and test method of inhibition several typical compositions of the invention were prepared and their activity determined. The activity of compositions of the invention was directly compared with that of other substituted benzene compounds. Results are reported as parts of chemical treating agent necessary to effectively inhibit one million microorganisms. These results are set forth in Table I.

In addition to the 48 hour inhibition test for *Aerobacter aerogenes* and 5 day inhibition test of *Aspergillus niger* activities of certain microbiocides of the invention were also determined and compared with structurally similar halo-nitro substituted benzenes with regard to 1 and 24 hour killing ranges. As indicated in the above test method an appropriate amount of 18 to 24 hour nutrient broth culture of *A. aerogenes* or spore suspension of *A. niger* was mixed with 200 milliliters of culture medium so as to give an inoculated culture medium having one million organisms per milliliter of culture medium. This inoculated culture medium was then added to tubes containing appropriate amounts of test chemicals, the total final volume of test chemical and culture medium being 20 milliliters in each tube. The maximum amount of test chemical introduced was 0.5 milliliters per tube to avoid the chemical-solvent interference. The inoculated media and test chemical were then mixed gently i.e., tubes were shaken in the *A. niger* fungal growth inhibition study, and inverted in the *A. aerogenes* inhibition study to fill the gas detection vials. At the end of 1 and 24 hours contact with the test chemicals, portions of the liquid in the test were diluted 1000 fold to stop the chemical action. The diluted samples were then cultured into sterile culture tubes, incubated for 48–72 hours at 30° C. and examined for growth. Results of these tests also tabulated in Table I then indicate the 1 and 24 hour killing ranges.

to simulate an industrial cooling tower. This apparatus, consisted essentially of a 5-gallon jar containing a series of wooden slats or test plates arranged in such a manner so that each alternate slat would lie directly under the slat above, such as is the situation found in the fill section of a cooling tower. At the start of the test, 10 liters of tap water are put in the jar, organic-inorganic nutrient added and the water media allowed to recirculate. As the water recirculates, it strikes the top deck of the ladder and then runs down through the holes in the top deck and over the slats in the same manner as water flow occurs in a typical cooling tower. Cultures of slime-forming organisms are inoculated into the system and the recirculators allowed to run for 96 hours during which time a heavy slime develops. Chemicals which are to be evaluated are put into the bacterial recirculators at zero hours and slimicide activity determined by ability to prevent slime deposition on the wooden slats or test plates over a period of two days. An initial check is made after 24 hours duration. An alcoholic solution of Composition A showed very good control in the above test against a bacteria inoculum taken from a representative cooling tower slime. The microbiological flora contained *Aerobacter aerogenes*, Pseudomonas, Flavobacterium and other contaminants.

While the compositions of the invention find special use in papermill water systems and industrial cooling towers, they may likewise be effectively employed in reducing and/or inhibiting growth of microorganisms in air conditioning equipment, internal combustion engines, the secondary recovery of petroleum in the process known as water-flooding, water wells and similarly related industrial food systems.

It is apparent that many modifications and improvements may be made without departing from the scope of the invention which is not to be limited other than as recited in the appended claims.

The expressions "microbiocidal agent" or "microbiocide," as used herein are meant to designate chemical substances which have killing and/or inhibiting action on such organisms as, for example, bacteria, fungi, algae, protozoa, and the like.

The invention is hereby claimed as follows:

1. The method of inhibiting the growth and reproduction of microbiological organisms in industrial process water systems which comprises the step of treating said system with at least a microbiocidal amount of a composition which comprises 2,4-dinitrohalobenzene.

TABLE I

| | Activity | | | | | |
|---|---|---|---|---|---|---|
| | *A. aerogenes* (bacteria) | | | *A. niger* (fungi) | | |
| | 1 Hr. Kill | 24 Hr. Kill | 48 Hr. Inh. | 1 Hr. Kill | 24 Hr. Kill | 5 Day Inh. |
| 2,4-dinitrochlorobenzene (Composition A) | >100 | >100 | 50/100 | >100 | 5/10 | 1/2.5 |
| 2,4-dinitrobromobenzene (Composition B) | >100 | >100 | 100/200 | >100 | 5/10 | 1/2.5 |
| 1,3,5-trichloro-2,4-dinitrobenzene | >100 | >100 | >100 | >100 | >100 | >100 |
| 3,4,6-trichloro-2-nitrophenol | >100 | >100 | >100 | >100 | >100 | >100 |
| 2,4-dinitrobenzene sulfonic acid | >100 | >100 | >100 | >100 | >100 | >100 |
| p-Nitrochlorobenzene | >100 | >100 | >100 | >100 | >100 | >100 |

As can readily be seen from the above table, typical compositions of the invention, Compositions A and B, exhibit excellent activity against fungi and bacterial, especially after relatively long contact periods. These materials have surprisingly and unobvious microbicidal activities when compared to closely related chemicals also tested. These latter materials were completely non-acceptable for purposes of the present invention.

In another test, the compositions of the invention were specially evaluated for their activity in inhibiting the growth and reproduction of bacteria and fungi which create slime. Specifically, the test apparatus was arranged 2. The method of claim 1 where said halo group is chloro.

3. The method of inhibiting the growth and reproduction of microbiological organisms in paper-making process water systems which comprises the step of treating said system with at least a microbiocidal amount of a composition which comprises 2,4-dinitrohalobenzene.

4. The method of claim 3 where said halo group is chloro.

5. The method of inhibiting the growth and reproduction of microbiological organisms in industrial cooling water systems which comprises the step of treating said system with at least a microbiocidal amount of 2,4-dinitrohalobenzene.

6. The method of claim 5 wherein said halo group is chloro.

7. A slime-controlled industrial paper mill white water system which contains therein an aqueous suspension of 0.1–15% by weight of cellulosic fibers based on the weight of the system and at least a microbiocidal amount of a slime control composition comprising 2,4-dinitrohalobenzene.

References Cited by the Examiner

Lecoq et al.: Chem. Abstracts, vol. 47 (1953), p. 3255H.

JULIAN S. LEVITT, *Primary Examiner.*

S. J. FRIEDMAN, *Assistant Examiner.*